April 14, 1931. H. LANDSIEDEL 1,800,865
COMBINED CASH REGISTER AND ADDING MACHINE
Filed Feb. 2, 1923 6 Sheets-Sheet 2
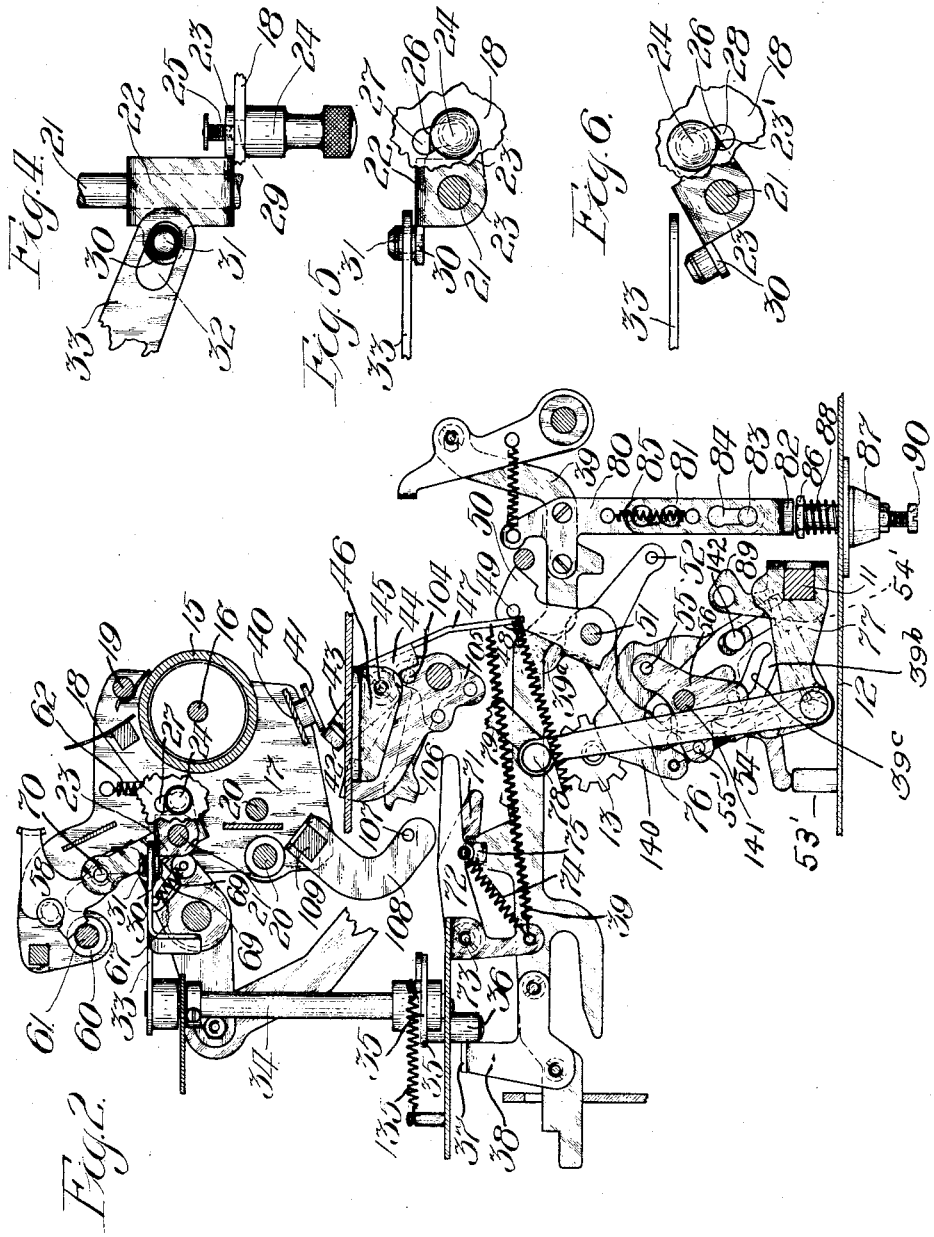
INVENTOR
Harry Landsiedel
BY
Banning & Banning
ATTORNEYS April 14, 1931. H. LANDSIEDEL 1,800,865
COMBINED CASH REGISTER AND ADDING MACHINE
Filed Feb. 2, 1923 6 Sheets-Sheet 3
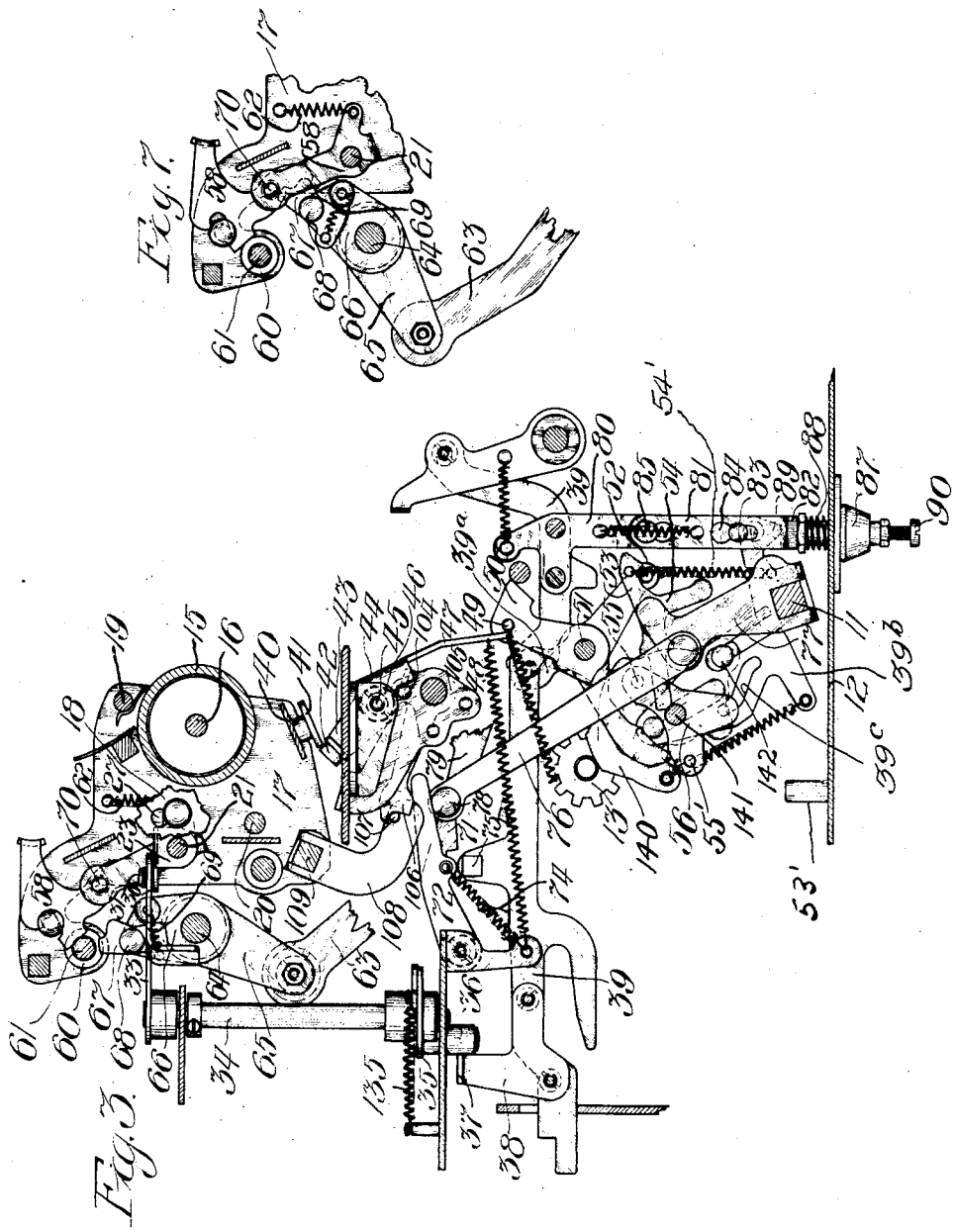
INVENTOR
*Harry Landsiedel.*
BY
ATTORNEYS April 14, 1931.  H. LANDSIEDEL  1,800,865
COMBINED CASH REGISTER AND ADDING MACHINE
Filed Feb. 2, 1923   6 Sheets-Sheet 4
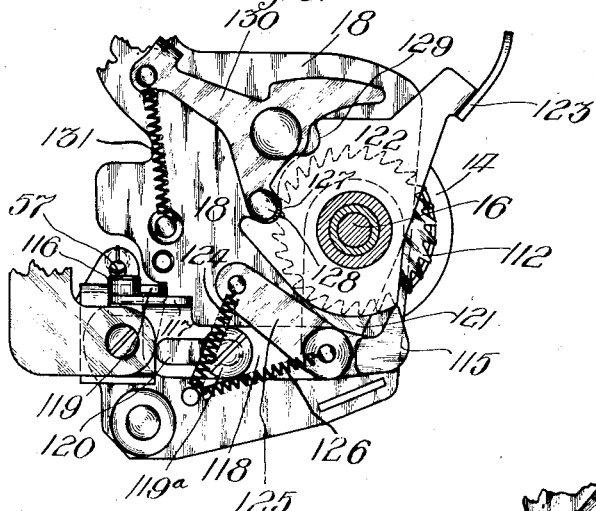
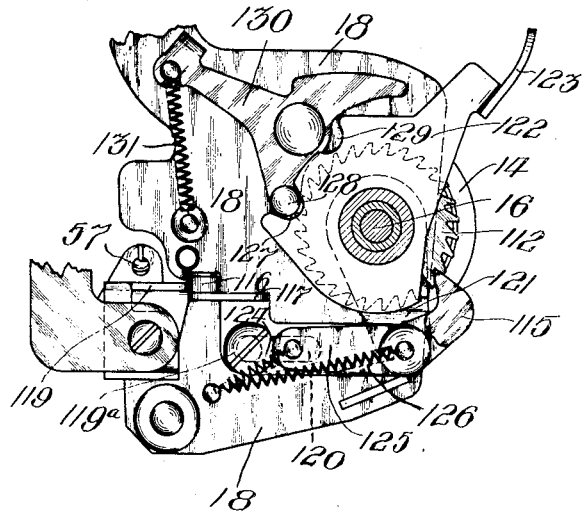
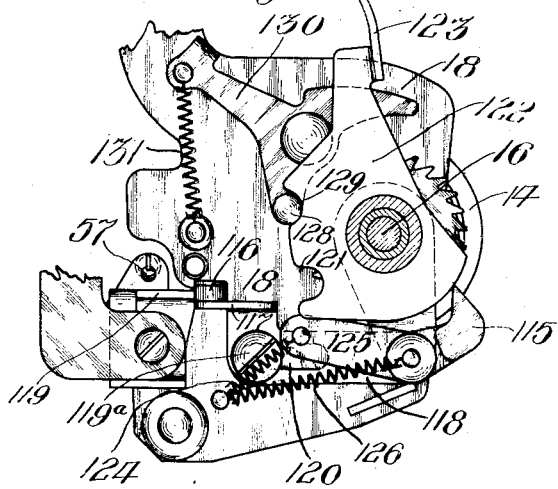
INVENTOR
Harry Landsiedel
ATTORNEYS

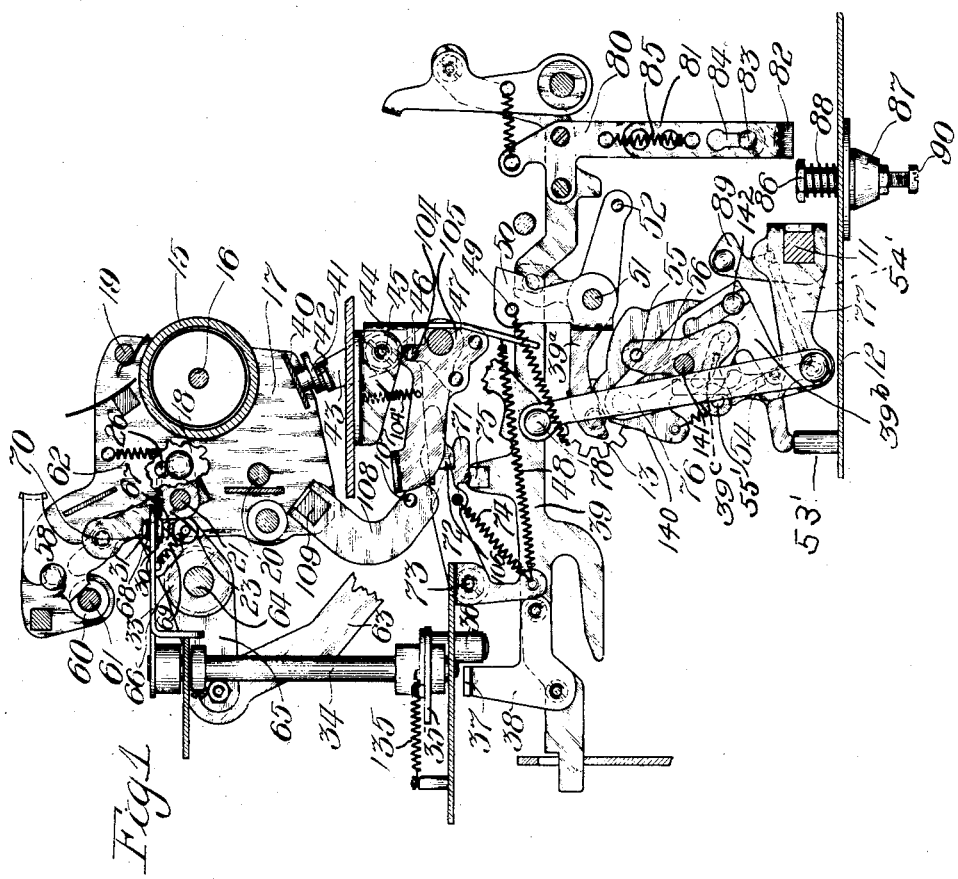

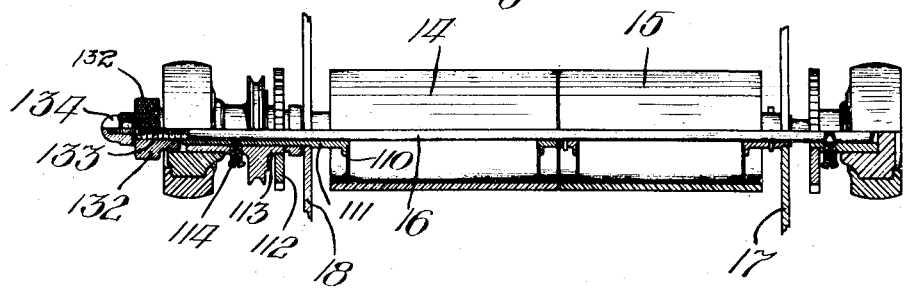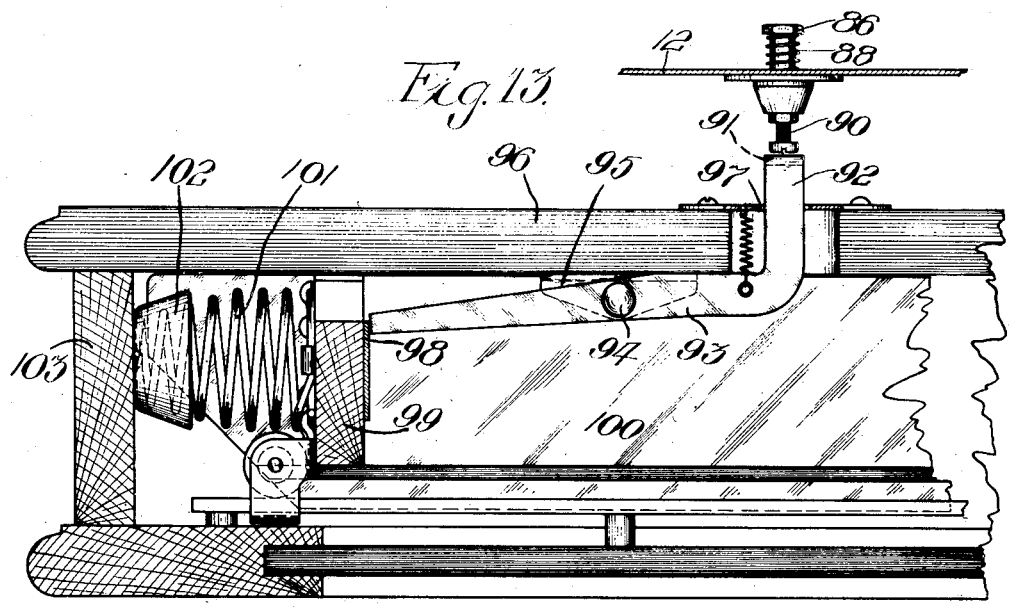

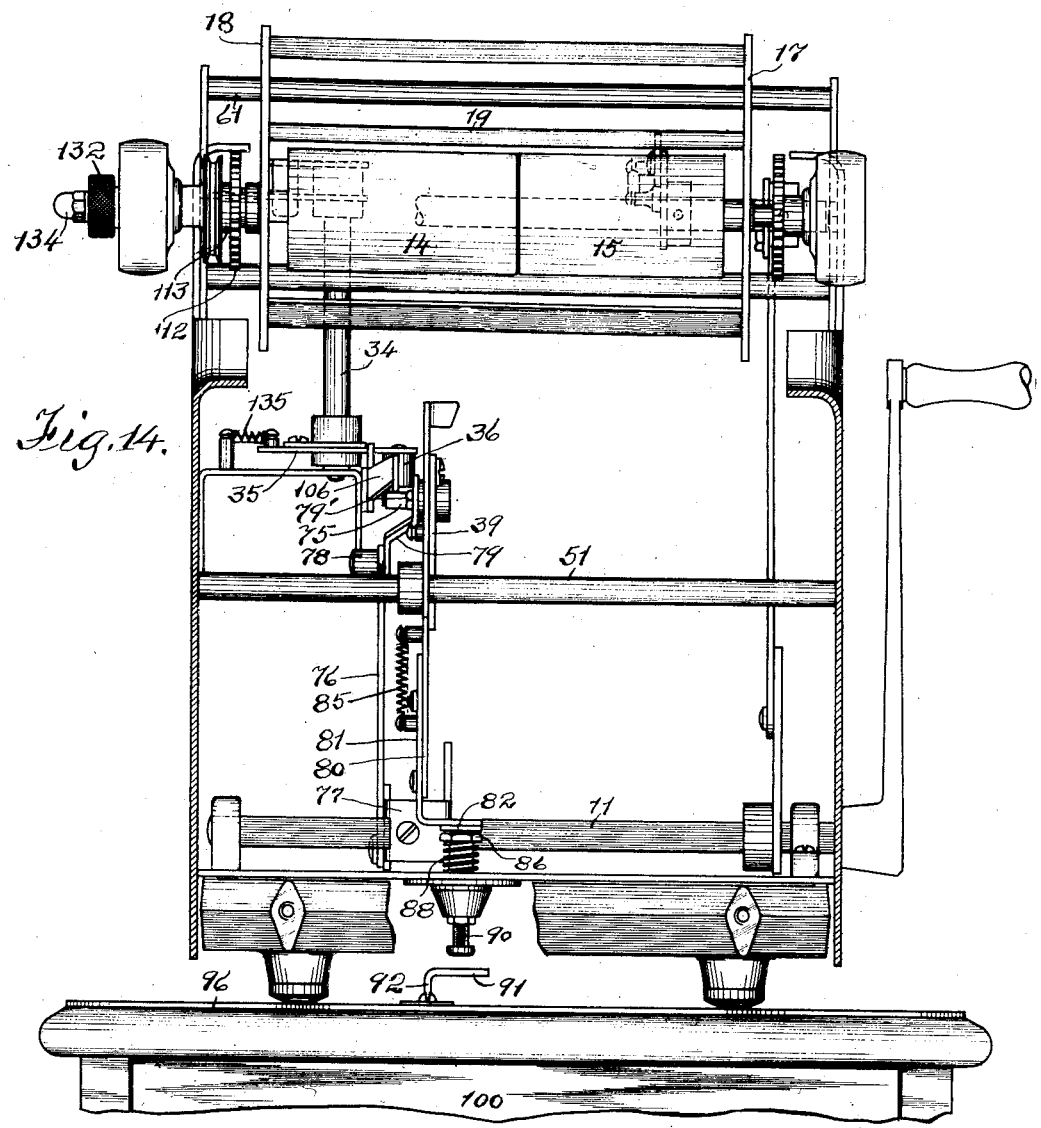

Patented Apr. 14, 1931

1,800,865

UNITED STATES PATENT OFFICE

HARRY LANDSIEDEL, OF CINCINNATI, OHIO, ASSIGNOR, BY MESNE ASSIGNMENTS, TO REMINGTON RAND INC., OF NEW YORK, N. Y., A CORPORATION OF DELAWARE

COMBINED CASH REGISTER AND ADDING MACHINE

Application filed February 2, 1923. Serial No. 616,472.

The present invention is directed to certain additions to and modifications of the structure of an adding machine of well known type for the purpose of adapting the standard features of the adding machine to the requirements of cash register operations without thereby reducing or impairing the capacity of the machine to subserve the usual functions of an adding machine.

In the operations for which the present machine is intended, it is necessary to provide for the imprinting of two strips of paper, one strip, which may be properly referred to as the detailed receipt slip, being imprinted with the amounts of various items purchased by a customer together with the total of such amounts, and the other strip, which may be properly termed the tally strip, having imprinted thereon only a list of totals for checking against the amounts of money deposited in the cash drawer which is combined with the present mechanism. The customer's detailed receipt slip occupies the right hand position on a two part platen and the tally strip occupies the left hand position, and the machine is so constructed as to render it necessary for the operator to imprint corresponding totals on both of the record strips in order to conclude a transaction, thereby preventing fraudulent manipulation of the machine and insuring a complete record on the tally strip of all moneys received for deposit.

With the above objects in view, mechanism is provided for ensuring automatic operation of the sub-total and grand total mechanisms by the movement of the carriage in bringing the receipt slip and tally strip successively to the printing line, instead of through the use of the usual sub-total and grand total keys which are meanwhile locked, thus ensuring proper operation of the mechanism. The invention further relates to means for automatically spacing the left platen each time a sub-total is printed on the tally strip prior to the shifting of the carriage to the left and the imprinting of the corresponding grand total at the foot of the items listed on the detailed receipt slip on the right platen.

The invention further relates to the means provided for locking the split platens together, so that the same will act in unison as one platen and carry a strip of paper of greater width, and also to the means for normalizing the automatic sub-totaling and grand totaling mechanism of the paper carriage when it is desired to have the paper carriage automatically nonadd items in the left position.

The invention further relates to the means for normalizing the automatic spacing of the platen when moved to list in the left hand column, if so desired when the automatic totaling mechanism is normalized to operate by the use of the usual total and sub-total keys.

The invention further relates to means for automatically opening the cash drawer when the machine is operated after positioning the paper carriage for a total, and to the various combinations of parts hereinafter set forth and described.

The accompanying drawings illustrate the various devices applied to the well known Dalton adding machine, although it is, of course, obvious that the use of the several devices is not restricted to adding machines of any particular make. So much of the general adding machine structure is shown and referred to as is necessary to a full understanding of the various features of the present invention, although, no effort will be made to describe the specific construction of various well known groups of mechanisms common in the adding machine art.

In the drawings:

Figure 1 is a sectional elevation of the machine showing the parts of the mechanism and their co-operating parts, in normal position;

Fig. 2 is a similar view with the paper carriage shifted to the right, and the parts in position ready to take a sub-total;

Fig. 3 is a similar view with the operating handle forward, in the act of taking a sub-total;

Fig. 4 is a plan view of the paper carriage connections with the automatic totaling mechanism;

Fig. 5 is a side view of the same;

Fig. 6 is a side view of the same parts with the paper carriage disconnected from the totaling mechanism;

Fig. 7 is a side view of the carriage releasing mechanism which allows it to tabulate automatically;

Fig. 8 is a side view of the line space mechanism for the left platen on paper carriage, showing it in normal position;

Fig. 9 is a similar view, showing the position of the parts when the carriage is drawn to the right;

Fig. 10 is a similar view showing the line space parts disabled;

Fig. 11 is a plan view of the left platen line space drive cam;

Fig. 12 is a front view of the split paper carriage platen showing the locking means, for causing the platens to act as one, the view being in half section;

Fig. 13 is a sectional view of the cash drawer and cabinet showing the drawer releasing mechanism; and Fig. 14 is a front view of the mechanisms more particularly forming the subject of the present invention.

Figure 1 illustrates various portions of the structure in the normal position with the carriage to the left in position to hold the receipt strip in correspondence with the printing line. The mechanism shown embraces various well known features such as a main handle controlled operating shaft 11 which occupies the usual position close to the base of the machine 12. The machine also includes the usual bank of adding wheels 13 which co-act with the racks of the usual type carrying sectors not shown, the adding wheels being normally lifted into mesh on the return stroke of the racks after the printing of items; in mesh on the forward stroke of the racks for printing totals; and in mesh with the racks on both forward and return strokes for the purpose of printing subtotals in a manner generally practised and universally understood in the adding machine art.

The means for lifting the adding wheels into rack engaging position, in so far as their operation is controlled by the special devices of the present invention, will be also described with the necessary amount of detail.

The mechanism further comprises a left hand platen 14 for carrying the tally strip, and a right hand platen 15 for carrying the receipt slip strip, which platens are mounted upon a continuous platen shaft 16 supported by right and left carriage end plates 17 and 18 respectively. The end plates are suitably connected, in the usual manner, by front and rear tie rods 19 and 20, and the carriage as a whole is mounted in the usual manner for movement to either a right hand or a left hand position with respect to the printing line. It is not deemed necessary to describe in detail the trackway for the carriage which may be of any approved and well known type like that, for instance, shown in the Hopkins Patent No. 1,039,130 of September 24, 1912.

With the carriage in the left hand position for the imprinting of items on a receipt slip, which occupies the right hand column, the various items comprising a customer's purchase will be introduced into the machine in the usual manner by the manipulation of the keys, as shown in the patent above mentioned, but after all the items have been listed and after the usual blank stroke of the operating lever, it will be found that no total can be taken by the manipulation of the usual total keys which are locked in some suitable way. The operator is, therefore, forced to take a sub-total by moving the paper carriage to the right in preparation for the imprinting of a preserved record on the tally strip. For the purpose of thus ensuring an automatic total, the following mechanism is provided:

The carriage structure includes a rear upper cross rod 21 which serves as a mounting for a bracket plate 22 (see Figs. 4, 5, and 6), which bracket plate is provided with depending ears 23 which embrace the rod 21 and afford a pivotal mounting thereon. The left ear of the bracket plate is extended forwardly to afford a tongue 23' which is normally locked to the adjacent left end plate 18 of the carriage, (shown as a fragment in Figs. 1, 2 and 3), by means of a knurled locking screw 24 provided with a threaded stud 25 of reduced diameter which is entered through an arcuate slot 26 in the end plate, which slot at its upper and lower ends merges into enlargements 27 and 28 respectively. The knurled locking screw, intermediate of the body portion and the threaded stud 25, is provided with a boss 29 which is of a size to enter either of the slot enlargements 27 and 28, which arrangement permits the tongue 23 to be locked in registry either with the lower or upper end of the slot, as indicated in Figs. 5 and 6 respectively. This adjustment enables the bracket to be tilted from its acting position as shown in Fig. 5 to an inactive or disabled position, as shown in Fig. 6.

The bracket on its rear edge is provided with a tongue 30 which carries a roller 31 adapted to engage a slot 32 in an upper arm 33 carried by a vertical rock shaft 34. The rock shaft at its lower end is provided with a transversely disposed arm 35 which at its right or distant end, as observed in Figs. 1, 2 and 3, carries a roller 36 which is adapted to engage with the forward edge of a flange 37 inturned from the upper end of an upstanding arm 38 carried at the rear end of a total link 39 slidably mounted for forward and rearward reciprocation.

Co-operative relation of these parts is such that as the carriage is manually moved to the right to bring the tally strip to printing position, the roller 36, through the connections described, will be swung rearwardly thereby retracting the total link 39 from the advanced position, shown in Fig. 1, to the retracted position, shown in Figs. 2 and 3, independently of any manipulation of the usual total or sub-total keys which, as above stated, are locked or otherwise disabled when the machine is adjusted for cash register use. This retraction of the total link swings the lower arm of the bell crank 39ª downwardly, which permits the adding wheels to remain in mesh with the racks on the forward stroke thereof for recording a total of the items accumulated in the adding wheels in the manner described in the Hopkins Patent No. 1,039,130. This automatic adjustment of the totaling mechanism by the movement of the carriage insures a recording on the tally strip of an amount commensurate with the total of the items recorded on the purchaser's receipt.

The totalizer engaging and disengaging means comprises a cam plate 140 pivoted on a rod 141 and carrying a slidable plate 39ᵇ slotted to receive the rod 141 and a pin 142 on the cam plate 140. The slidable plate 39ᵇ is provided with a slot 39ᶜ which receives a pin on one arm of a three armed lever 56 pivoted on the shaft 141. The other arms of this lever are provided with studs 55 and 55′ for cooperation with either of the shoulders on the tail 53 of a wipe pawl 54 carried by an arm 77 on the main rock shaft 11.

The spring 54′ attached to the pawl 54 maintains it in engagement with either of the studs 55, 55′ depending upon the position of the arm 77, attached to the main rock shaft. In the normal, or rest position of the arm 77 the pawl 54 is maintained in position by its tail resting on the stud 53′, located in the base 12.

By referring to Figure 1, it will be clear that as the rock shaft 11 is rocked to the right, the rear shoulder of the tail 53 of the wipe pawl 54 will engage the stud 55′ and rock the lever 56, slidable plate 39ᵇ and cam plate 140 clockwise thereby removing the high portion of the cam on the cam plate out of supporting relation with the shaft of the totalizer 13. This permits the totalizer to move out of mesh with the racks during the forward stroke of the handle.

When the shaft 11 is rocked backwardly, the high portion of the cam on the cam plate 140 will raise the totalizer into rack engaging position for adding.

In total taking operations, the arm 39ª engages a pin on the slidable plate 39ᵇ (Fig. 2) and through the cam slot 39ᶜ rocks the lever 56 thereby removing the stud 55′ out of the path of the tail 53 of the wiper 54 thereby permitting the totalizer to remain in its raised rack engaging position during the forward stroke of the handle. On the backward stroke of the handle the tail 53 of the wiper 54 will engage the stud 55 and rock the lever 56, and plates 39ᵇ and 140 counterclockwise thereby permitting the totalizer to lower into disengaged position.

When a sub-total is to be taken, the conditions are the same as in the case of taking a total, except that a stud 52 later referred to is positioned as in Figure 3 to prevent the tail 53 of the wipe pawl 54 from engaging the stud 55 so that the totalizer will remain engaged during the backward movement of the handle.

The totalizer engaging mechanism is shown in the patent to Landsiedel 1,416,364, May 16, 1922, in connection with the usual front totalizer.

However, it is necessary that the record imprinted on the tally strip be taken as a sub-total, rather than a grand total, in order that the same amount may be afterwards imprinted on the customer's receipt, and this requires that means be provided for holding the adding wheels in mesh with the racks on both the forward and return movement thereof, so that the machine will not at this stage be cleared, and mechanism for effecting this result will now be described.

The carriage is provided at its forward lower end corner with a cross plate 40 which carries a cam plate 41, which is so disposed that during its movement to the right preparatory to taking a tally record it will engage a roller 42 carried at the upper end of an arm 43 upstanding from a swinging bracket 44 pivoted at 45 to a fixed bracket plate 46. The bracket 44 is provided with a depending finger 47 adapted to be moved forwardly against the tension of a spring 48, when actuated by the cam 41, and in so moving the finger will engage and carry forward a stud 49 mounted upon the upper arm of a bell crank 50 pivoted on a cross rod 51. The lower arm of the bell crank carries a stud 52 which when actuated, as in Fig. 2, will be lowered to a position such that it will be engaged by the tail 53 of a wipe pawl 54 on the forward movement of the operating handle, as indicated in Fig. 3, thus keeping the wipe pawl from acting against a stud 55 on a member 56 which controls the raising and lowering of the adding or accumulating wheels with the result that said wheels will remain in mesh during the rearward movement of the main shaft, and this in conjunction with the mechanism controlled by the total link 39 maintains a constant mesh of the adding wheels and gives a sub-total on the tally strip carried by the left platen. In general the mode of operation of the mechanisms for raising and lowering the adding wheels is similar to that shown and described in Patent No. 1,039,130, and being well understood in the art, it is not deemed necessary to describe these features in detail except in so far as the action of these parts is regulated and controlled by the mechanisms actuated through the movements of the carriage, which are special to the present invention.

When a sub-total is thus imprinted on the tally strip, it becomes necessary to secure a like record on the purchaser's receipt, and means are provided for automatically releasing the carriage and permitting it to move to the left under the tension of a coil spring 57, shown in Fig. 8, which is stretched when the carriage is manually shifted to the right. The means for holding the carriage in the right hand position and for automatically releasing the carriage by the stroke of the handle will now be described.

The carriage is held under tension in the right hand position by means of a latch 58 of U-shaped formation which is pivoted on the cross rod 21 extending between the side plate of the paper carriage, as shown in Fig. 7 which latch is adapted to engage with a groove 60 turned near the right hand end of the stationary cross bar 61 which lies to the rear of the upper portion of the carriage structure. The lower or tail end of the latch 58 is engaged by a spring 62 which exerts an upward tension tending to hold the acting end of the latch closely against the surface of the bar 61 during the shifting movements of the carriage, so that when the groove 60 is reached, the carriage will be latched and held in the right hand position. After the imprinting of the sub-total on the tally strip, it becomes necessary to unlatch the parts by the continued movement of the operating handle, which action is effected by the following mechanism:

The link 63 connects the main shaft with the usual type and gear sector shaft 64 through an arm 65 keyed to said shaft. The shaft has mounted thereon an arm 66 which carries a pawl 67 secured to the arm by a shouldered stud 68. The pawl acts under the tension of a spring 69 secured to its tail portion in such a way as to permit the pawl to yield forwardly under spring tension when the handle is moved from its normal position, indicated by the position of the parts in Fig. 1 to the retracted advanced position indicated by the position of the parts in Fig. 3. This movement of the handle swings the pawl rearwardly under a cross connecting rod 70 which constitutes a portion of the structure of the latch, the body of which latch is of generally U-shaped formation. As the pawl, moving rearwardly, engages the rod 70 it will yield under the tension of the spring, and after release, the pawl will spring upwardly into the position indicated in Fig. 3, so that upon the return movement of the operating handle, the pawl, as it springs forward, will unyieldingly engage the rear edge of the rod 70 and throw the latch forwardly under the tension of the spring 62 thereby disengaging the tooth of the latch from the groove in the rod 61 which releases the carriage and immediately causes it to escape from its right hand position in preparation for the recording of a grand total on the purchaser's receipt.

This left hand movement of the carriage has the effect of imparting a rocking movement to the vertical shaft 34 and of releasing the tail end of the total link bar 39 from engagement by the roller 36, and would thus throw the parts out of total adjustment were additional means not provided for holding the bar in its retracted position. Such means are found in a hook 71 which is secured to a strike arm 72 both of which are pivotally mounted at the point 73. The hook and strike arm are drawn down by the tension of a spring 74 and when lowered are in position to engage with the stop pin or shoulder 75 on the total link 39, so that despite the forward return of the roller 36, the total link 39 will be held against movement during the movement of the carriage to the left hand position.

However, it is necessary at this stage to make provision for the recording of a grand total, and this is effected through the release of the roller 42 by the carriage cam 41, so that the arm 47 and stud 52 which control the action of the adding wheels in securing a sub-total will be restored to the position shown in Fig. 1, thereby permitting the tail 53 on the wipe pawl 54 to swing under the stud 52 which results in a meshing of the adding wheels with the racks only on the forward stroke of the racks, thereby recording a grand total on the purchaser's receipt.

Immediately before the grand total is printed, and just as the main shaft completes its forward stroke, a link 76 connected with the mainshaft arm 77 at one end and with a stud 78 at the other end, lifts to the position shown in Fig. 3, thereby engaging the strike arm 72 and lifting the hook 71 to disengage the stop pin 75 and permit restoration of the total link to its forward position when the operation is completed. The movement of the upper end of the link is governed by a rock arm 79 pivoted to a pin 79' (see Fig. 14). Since the tail 53 of the wipe pawl 54 is not controlled during this operation by the stud 52 as described above, the wipe pawl will contact the front stud 55 as the handle starts to restore and cause the adding wheels to be unmeshed from the racks on the rear stroke thereof, so that a grand total will be secured with a consequent clearing of the machine in preparation for future transactions. After the above operations have been completed, the customer's slip containing the items and the total of them is torn off and handed to the customer, which serves as a receipt for the payment of money which the customer then hands to the operator for deposit in the cash drawer, the tally strip meanwhile remaining on the machine as a permanent record of the amount received from the customer.

Attention is now directed to the means for automatically opening the cash drawer which operates when the handle is operated for a total but not when an item is listed or when a blank stroke of the handle is made. The total link is provided near its forward end with a depending rigidly secured arm 80, which arm has slidably mounted thereon a foot bar 81 which terminates in a foot 82. Sliding connection between these parts is afforded by headed studs 83 entered through key hole slots 84, and the foot bar is normally held elevated by the tension of a spring 85. The foot, as indicated in Fig. 1, normally occupies a position immediately in advance of and practically on a level with a plunger 86 which slides up and down through bearings 87 secured to the base plate 12, being normally held elevated by the action of a coil spring 88. When the total link is moved rearwardly, it carries with it the foot 82 which thus is brought to a position immediately above the plunger. The main shaft 11 carries the nose 89 which is so positioned that it will just clear the top of the plunger when the foot is in the advanced position. When, however, the foot is retracted, as in Figs. 2 and 3, and interposed between the plunger and the nose, the action of the latter will serve to depress the foot and with it the plunger, as best indicated in Fig. 3.

The lower end of the plunger, which is in the form of an adjustable screw 90, occupies a position immediately above a flange 91 (Fig. 13) struck laterally from the upper arm 92 of a latch bar 93 which is medially pivoted to a pivot stud 94 carried by a bracket plate 95 secured to the underside of the top 96 of the cash drawer cabinet.

The rear end of the latch bar is normally held in lowered position through the tension of a spring 97 and when lowered engages a stop plate 98 secured to the rear wall 99 of the cash drawer 100. The cash drawer is acted upon by a coil spring 101 housed within a cup 102 secured to the rear wall 103 of the cabinet, and when the plunger is depressed it serves to elevate the rear end of the latch bar, thereby releasing the drawer and permitting the spring to throw the drawer out in open position. The conclusion of the recording of a transaction restores the foot 82 to the advance position, shown in Fig. 1, so that after the operator has made use of the drawer it is pushed back into the cabinet and the spring strikes into the cup 102, the spring is compressed, and the latch re-engages the rear wall of the drawer and holds it in latched position.

It is not desirable to actuate the right hand platen 15 which carries the receipt slip by the usual line spacing mechanism when the carriage is in its right hand position, as this would cause the paper to move forward an unnecessary space for the sub-totals printed on the tally strip. This automatic nonspacing is accomplished by the action of the cam 41 (Figs. 1, 2 and 3) which automatically operates the mechanisms for securing a sub-total. As the carriage is manually shifted to the right, the cam 41 sweeps across the roller 42 on the arm 43, already described, and the bracket arm 44 moves forward. This bracket arm is engaged by a stud 104 which is carried by a pivotally mounted bracket 105 which is rigidly associated with a block arm 106. A spring 104' (Fig. 1) is provided for holding the stud 104 in constant engagement with the bracket 44, so that the stud will follow the movements of the bracket and as the latter is moved forwardly, the block arm 106 will be moved to the position shown in Figs. 2 and 3. When in this position, the block arm will lie in the path of movement of a stud 107 carried by an arm 108 mounted on a square shaft 109, the movements of which ordinarily serve to space the paper through pawl and ratchet connections of the type shown in Patent No. 1,039,130, but when the block arm is lifted it will so restrict the movements of the shaft 109, that no spacing of the paper will be effected when it is in the right hand position, that is, in a position ready to print on the left hand platen.

The spacing of the paper on the left hand platen 14, which only takes place when a sub-total is taken on the tally strip, is accomplished as follows:

As shown in Fig. 12 the end bearing flange 110 of the platen 14 is rigidly fastened to a bearing sleeve 111, which ordinarily revolves freely on the shaft 16 to which the platen 15 is pinned. A ratchet 112 and hub 113 which are permanently secured together are held to the sleeve 111 by a set screw 114, and by this arrangement it will be seen that the platen 14 will move with the ratchet 112. The latter is advanced one tooth at a time by a pawl 115 (see Fig. 8), each time the paper carriage is moved to the right through the action of a roll 116 mounted on an ear 117 of the slide bar 118 which roll rides on the face of the cam 119 from the normal position, shown in Fig. 8, when the carriage is at the left to the position shown in Fig. 9 when the carriage is at the right.

The rear end of the slide bar 118 is supported on the left side plate 18 by the shouldered screw 119ª which fits in a slot 120 of the slide plate, while the front end thereof is supported by a rock arm 121 which moves about the platen shaft 16 as a center, and which has at its lower end a bearing supporting the pawl 115 in addition to the slide plate.

The pawl 115 normally rests against the edge of a rotatable stop plate 122 provided with a thumb piece 123 which enables it to be rocked about the platen shaft as an axis, and this arrangement holds the acting end of the pawl clear of the teeth on the ratchet wheel 112, so that the ratchet may be turned manually in either direction, but when the slide link is moved forward by contact of the roll 116 traveling across the cam face 119, as the carriage is moved to the right, then the pawl advances and as soon as it clears the end of the rotatable stop plate, it will be tilted by the action of a spring 124 which connects with the tail end 125 of the pawl, causing the pawl to spring upwardly as indicated in Fig. 9, and engage with and move the ratchet through the distance of a single tooth. This automatically moves the left hand platen one space each time the tally strip is brought into position to receive the imprint of a sub-total.

When the carriage is released by the stroke of the handle in recording the sub-total, it will spring back to the left position, and the roller 116 riding back along the cam 119 will permit the slide link 118 to be brought back by the tension of a spring 126 until the pawl is again retracted by engagement with the lower edge of the rotatable stop plate 122.

The stop plate is normally held in the position shown in Figs. 8 and 9 by the engagement of a notch 127 in the rear edge of the stop plate with the stud 128, but if it is desired to completely disable the automatic spacing mechanism, the stop plate is rotated to a position such as to bring an upper notch 129 in register with the stud, and this will rotate the acting edge of the plate sufficiently forward to prevent escape of the pawl even when the latter is moved to its foremost position as indicated in Fig. 10. The stud 128 is carried by a pivoted rocking arm 130, the tail end of which is engaged by a spring 131 which permits the parts to yield sufficiently to effect engagement and disengagement of the stud 128 with either of the respective notches.

It may be necessary in handling certain classes of work to lock the two platens together, so that they will operate as a unit. This is accomplished by the provision of a knurled nut 132 (Fig. 12) on the outer threaded end 133 of the platen shaft, which nut may be screwed inwardly to bear against the outer end of the bearing sleeve 111 which serves to inwardly press the platen 14 into close engagement with the platen 15, so that the two will in effect be frictionally locked. Disengagement can be effected by retracting the knurled nut until it engages with a stop nut 134 which caps the extreme end of the platen shaft. The two platens are locked together and used in unison with a double width sheet of paper when statements are to be made or for similar classes of work. In these circumstances, the automatic spacing mechanism for the left platen is disabled in the manner already described, and the automatic sub-total and totaling of the paper carriage normalized in a manner now to be described, so that the totals and sub-totals can be taken by the usual total or sub-total keys which are then unlocked and thrown into commission for use in the usual manner.

To effect the above result the knurled nut 24 (Figs. 2, 4, 5 and 6), is unscrewed until the boss 29 may be disengaged from the lower enlargement 28 of the slot 26, after which bracket 22 is tilted down, as in Fig. 6, thereby disengaging the roller 31 from the slot 32, so that movements of the carriage will be ineffective to fully actuate the total and sub-total adjusting mechanisms, which thereafter may be operated by use of the keys in a manner common in the adding machine art.

However, when these normalizing adjustments are effected, the carriage cam 41 will still engage the roll 42 when the carriage is moved to the right, and the connections, already described, will cause the stud 52 (Fig. 1) to move down into the path of the tail on the wipe pawl 54, so that the wipe pawl will not act on the stud 55 of the adding wheel control mechanism, and, therefore, an item listed in the left column, that is an item which is listed when the paper carriage is in the right hand position, will not be added. This feature is used for printing dates on statements, or handling amounts which are not to be added in other classes of work.

A spring 135 secured to the arm 35 at the base of the vertical rock shaft 34 holds the parts in a position where the roll 31 may easily be brought into register with the slot 32 when the carriage is to the left, and it is desired to change the machine to effect an automatic totaling by movement of the carriage to the right.

In operation for cash register transactions, the carriage will initially occupy the left hand position with the itemized receipt strip in register with the printing line. With the parts in this position, the totaling mechanisms will be inactive, and items may be imprinted in column form upon the receipt slip by successive operations of the handle. With the parts in this position the line spacing mechanisms for the right hand platen will function in the ordinary manner with each stroke of the handle, since with the carriage in the left hand position, the means for blocking the full movement of the square line spacing shaft 109 will remain inactive. After the several items have been thus listed in column form, the carriage will be manually shifted to the right to move the left platen with its tally strip to the printing position, and this movement will automatically set the mechanisms necessary to record a sub-total and will automatically likewise effect a single line spacing movement of the left hand platen, and meanwhile block the usual platen line spacing mechanisms. The handle will thereupon be pulled and with the platen in the right hand position, the adding wheels will be held in mesh with the racks both on the advance and restoration thereof, so that a sub-total will be imprinted on the tally strip and the carriage automatically released to escape to its left hand position. This escape of the carriage to the left renders inactive the special sub-totaling features, so that on the next movement of the handle the adding wheels will engage the racks only on the forward movement thereof, and a grand total will be imprinted, the total link released and the machine cleared and restored to normal position.

With the right hand movement of the carriage after the imprinting of the customer's receipt, the drawer opening mechanisms will be brought into active register, so that with the handle pull which imprints the sub-total on the tally strip, the drawer will be automatically opened for the receipt of the purchase money.

Where it is desired to use the machine for ordinary adding machine purposes, the carriage may be shifted to the left to bring the right hand platen to the printing line, the automatic totaling connections may be disabled and the usual total and sub-total keys thrown into commission after which the mechanism will operate in the usual manner, and normal line spacing will be effected in the regular way.

Where special tabulating is desired, the two platens may be clamped together to operate in unison, the key control for the totalizing mechanism utilized, the special line spacing features disabled and the mechanism employed to print nonadding numerical data in the left hand column and to print and add numerals in the right hand column in the manner already described.

The special features of the present invention are of such nature that they may be added to or used in adjunctive relation with adding machines of the type now commonly on the market without requiring any substantial change or modification of the adding machine structure and without in any way interfering with the use of such adding machines for ordinary adding purposes. At the same time the machine makes provision for the safe conducting of cash transactions in such a manner as to render difficult or impossible any fraudulent attempt on the part of the operator to withhold a complete record of each cash transaction. At the same time the purchaser is furnished an itemized receipt slip giving the complete details of the general transaction.

Although the invention has been described with considerable particularity as to detail, it is not the intention that the claims should be limited to the precise mechanisms shown and described, since it is obvious that numerous modifications in the formation of the respective mechanisms and in the manner of imparting motion thereto might be made without departing from the spirit of the invention.

I claim:

1. In a machine of the class described, the combination of a transversely movable paper carriage, adding wheels, means for bringing the same into rack engaging position, connections operable by a movement of the carriage in one direction to automatically condition the machine to secure a sub-totaling operation, and means controlled by a return movement of the carriage to thereafter condition the machine to produce a grand totaling operation, substantially as described.

2. In a machine of the class described, the combination of a transversely movable paper carriage, adding wheels, means for bringing the same into rack engaging position, connections operable by a movement of the carriage in one direction to automatically condition the machine to secure a sub-totaling operation, and means controlled by a return movement of the carriage to thereafter condition the machine to produce a totaling and clearing operation, said last mentioned means including mechanism for temporarily latching a portion of the mechanisms utilized in the sub-totaling operation, substantially as described.

3. In a machine of the class described, the combination of a transversely movable paper carriage, right and left platens carried by the paper carriage, adding wheels, means for moving the adding wheels into and out of rack engaging position, connections between the carriage and the adding-wheel-moving mechanisms for permitting the adding wheels to maintain rack engaging position on the forward movement of the racks, additional connections between the carriage and the adding-wheel-moving mechanisms for holding the adding wheels in engagement with the racks on the return movement of the latter, both of said sets of connections being moved for effective action by the movement of the carriage in one direction, and means for retaining one of said sets of connections in effective acting relation upon a return movement of the carriage whereby a sub-totaling operation and a corresponding grand totaling operation may be performed, substantially as described.

4. In a machine of the class described, the combination of a transversely movable paper carriage, right and left platens carried by the paper carriage, adding wheels, means for moving the adding wheels into and out of rack engaging position, connections between the carriage and the adding-wheel-moving mechanisms for permitting the adding wheels to maintain rack engaging position on the forward movement of the racks, additional connections between the carriage and the adding-wheel-moving-mechanisms for holding the adding wheels in engagement with the racks on the return movement of the latter, both of said sets of connections being moved for effective action by the movement of the carriage in one direction, and means for retaining one of said sets of connections in effective acting relation upon a return movement of the carriage whereby a sub-totaling operation and a corresponding grand totaling operation may be performed, and means operable at the conclusion of the grand totaling operation for releasing said retaining means and clearing the machine, substantially as described.

5. In a machine of the class described, the combination of a transversely movable paper carriage, right and left platens mounted on the carriage, a rock shaft adapted to be actuated by back and forth movements of the carriage, a cam carried by the carriage, adding wheels, means for moving the adding wheels into and out of rack engaging position, means operable by the movement of the rock shaft for controlling movements of the adding-wheel-moving-means, connections operable by the cam for controlling the movements of the adding-wheel-moving-means, the conjoint actuation of both sets of connections by the carriage when moved to one position serving to hold the adding wheels in rack engaging position throughout the forward and return movement of the racks, and a movement of the carriage in the reversed direction acting to maintain rack engagement of the wheels during the forward movement only of the racks, substantially as described.

6. In a machine of the class described, the combination of a transversely movable paper carriage, right and left platens mounted on the carriage, a rock shaft adapted to be actuated by back and forth movements of the carriage, a cam carried by the carriage, adding wheels, means for moving the adding wheels into and out of rack engaging position, means operable by the movement of the rock shaft for controlling movements of the adding-wheel moving means, connections operable by the cam for controlling the movements of the adding wheel moving means, the conjoint actuation of both sets of connections by the carriage when moved to one position serving to hold the adding wheels in rack engaging position throughout the forward and return movement of the racks, and means operable when the carriage is moved to the other position to effect restoration of the adding wheels to nonengaging position after a movement in one direction only of the racks for securing corresponding sub-total and grand total records, substantially as described.

7. In a machine of the class described, the combination with means for supporting a total record strip to be retained in the machine, means for supporting an issuing item and total record strip, means for conditioning the machine to record items on the issuing strip, means for conditioning the machine to record on the retained record strip, and means operable as an incident to conditioning the machine to record on the retained record strip for causing a record of the total to be made on such strip.

8. In a machine of the class described, the combination with means for supporting a total record strip to be retained in the machine, means for supporting an issuing item and total record strip, means for conditioning the machine to record items on the issuing strip, means for conditioning the machine to record on the retained record strip, means operable as an incident to conditioning the machine to record on the retained record strip, for causing a total to be printed on such strip, and means operable during the operation of recording said total for causing the issuing record strip to receive the next record printed.

9. In a machine of the class described, the combination with means for supporting a total record strip to be retained in the machine, means for supporting an issuing item and total record strip, means for conditioning the machine to record items on the issuing strip, means for conditioning the machine to record on the retained record strip, means operable as an incident to conditioning the machine to record on the retained record strip, for causing a total to be printed on such strip, means operable during the operation of recording said total for causing the issuing record strip to receive the next record printed, and means for causing said next record to be a total of the items.

10. In a machine of the class described, the combination with means for supporting a sub-total record strip to be retained in the machine, means for supporting an issuing item and total record strip, means for conditioning the machine to record items on the issuing strip, means for conditioning the machine to record on the retained record strip, means operable as an incident to conditioning the machine to record on the retained record strip, for causing a sub-total to be printed on such strip, and means operable during the operation of recording said sub-total for causing the issuing record strip to receive the total next printed.

11. In a machine of the class described, the combination with means for supporting a sub-total record strip to be retained in the machine, means for supporting an issuing item and total record strip, means for conditioning the machine to record items on the issuing strip, means for conditioning the machine to record on the retained record strip, means operable as an incident to conditioning the machine to record on the retained record strip, for causing a sub-total to be printed on such strip, means operable during the operation of recording said sub-total for causing the issuing record strip to receive the next record printed, and means for causing said next record to be a total of the items and for clearing the machine.

12. In a machine of the class described, the combination of means for supporting an item and total record strip, means for supporting a total record strip, means for alternatively positioning said strips in printing position, and to automatically control the machine to print totals upon the second position of said strips, and separate feeding mechanisms for said strips actuated only when the respective strips are moved into printing positions.

13. In a machine of the class described, the combination of means for supporting an item and total record strip and means for supporting a total record strip shiftable into the same position to receive impressions, means permitting the machine to record items when the item and total record strip is in printing position, means conditioning the machine for the printing of a total when the total record strip is in printing position, and means for retaining such condition as to enable the printing of a total when the item and total strip is brought to printing position subsequent to an impression of a total on the total strip.

14. In a machine of the class described, the combination of means for supporting an item and total record strip, means for supporting a total record strip, means for positioning either in printing position and controlling the machine to record items and totals with clearing on one and sub-totals only on the other, separate feeding means for said strips, and means operable as an incident to the positioning of the strips for causing the respective feeding means to function to space the impressions on their respective strips.

15. In a machine of the class described, the combination of a cash drawer, a latch for releasing the cash drawer, a plunger for actuating said latch, a carriage, totaling devices operable by transverse movement of the carriage, a member associated with said totaling devices and adapted to be moved with the latter to a position in register with the plunger, a main shaft, and a member carried by the main shaft and adapted to engage and move said plunger actuating member when the handle is operated, substantially as described.

16. In a cash register, a cash drawer, a latch for maintaining said drawer in closed position and operable to permit said drawer to be moved into open position, a calculating machine having a carriage capable of occupying a plurality of positions, an operating handle, means normally inactive during operation of said handle for taking a total and operating said latch, and apparatus set by the movement of said carriage for causing said means to be actuated during the operation of said handle.

17. In a cash register, a cash drawer, a restraining means therefor for retaining it in closed position and operable to permit said drawer to be moved into open position, a calculating machine having a carriage capable of being moved into a plurality of positions, total taking mechanism and an operating handle, apparatus having parts connected between said carriage and said total taking mechanism for causing said machine to take a total in one position of said carriage and upon movement of said carriage into another position to take another total, and connections between said total taking mechanism and the restraining means operated when the total taking operation takes place.

18. In a cash register, a cash drawer, a latch for maintaining said drawer in closed position and operable to permit said drawer to be opened under the action of a resilient opening means, a calculating machine having a platen device movable to a plurality of record positions, listing and totaling mechanism arranged to operate upon said platen device, apparatus between said platen device and the listing and totaling mechanism for setting said machine for a listing operation in one position of said platen device and in another position of said platen device, for totaling operation only, and means set by said platen device in its totaling position for actuating said latch to release said cash drawer.

19. In the combination of a calculating machine and a cash drawer, a carriage on said calculating machine, an operating handle for said calculating machine, means for resiliently urging said drawer into open position, a latch for restraining said drawer, and releasing means for said latch operated by said handle under the control of said carriage.

20. The combination of listing and totaling mechanism, a longitudinally movable carriage arranged to cooperate therewith, a cash drawer, apparatus between said carriage and the listing and totaling mechanism for setting the said mechanism for a listing operation with said carriage in one position only, a sub-totaling operation with said carriage in another position only but requiring a total with clearing to be taken with the carriage in said first mentioned position upon the next operation of the machine, and means set by said totaling mechanism for actuating said latch to release said cash drawer upon a sub-totaling operation of the machine.

21. The combination of listing and totaling mechanism, a longitudinally movable carriage arranged to cooperate therewith, apparatus between said carriage and said listing and totaling mechanism for setting the said mechanism for a listing operation with said carriage in one position only and for a sub-totaling operation with said carriage in another position only but requiring a total with clearing to be taken with the carriage in said first mentioned position upon the next operation of the machine.

22. The combination in an adding machine, of listing, adding and total taking mechanism, a carriage capable of occupying two positions for producing a report in two columns, means for causing the mechanism to list and add in one column only and to take a total of items therein listed only after a sub-total has been recorded in the other of said columns, said means including apparatus between said carriage and mechanism.

23. The combination with adding mechanism and a carriage capable of occupying two positions for printing two columns of numbers, of means settable to condition the machine for taking a total, means whereby the carriage when shifted to one of these positions sets said settable means to take a total, a latch for holding said settable means in set position and means for automatically releasing said latch by the operation of the machine to take a total in the other column position.

24. The combination with adding and totaling mechanism and a carriage shiftable to two positions for printing amounts in two columns, of mechanism settable to condition the machine for taking a total, said settable mechanism being normally inoperative in the first of the two carriage positions, means whereby the shifting of the carriage to the second position, sets said settable mechanism to enable a total to be printed in said second position, a latch for retaining said settable mechanism in set position after the printing of a sub-total and means for releasing said latch by the operation of printing a total in the first column.

25. The combination with adding mechanism and a carriage shiftable to two positions for printing amounts in two columns, of mechanism settable to condition the machine for taking a total, said settable mechanism being normally inoperative in the first position of the carriage, means whereby the shifting of the carriage to the second position sets said settable mechanism to print a total in said second position, means controlled by the shifting of the carriage to its second position to cause the total printed in that position to be a sub-total, the last recited means being inactive in the first position of the carriage, a latch for retaining said settable mechanism in set position after the printing of the sub-total, and means actuated by the action of total taking in the first column for releasing said latch.

26. The combination with adding mechanism including register wheels movable to active and inactive position, to and fro movable operating mechanism, and a carriage shiftable to two positions for printing amounts in two columns, of a device settable to condition the machine for taking a total, said device being normally inoperative in the first position of the carriage, means whereby the carriage when shifted to its second position, sets said device, causing the register wheels to be moved to operative position on the forward stroke of said operating mechanism and moved to inactive position on the return stroke of said operating mechanism whereby a total is taken, means controlled by the shifting of the carriage to its second position for disabling the means for causing the register wheels to be moved to inactive position on the return stroke of the operating mechanism whereby a sub-total is taken in the second position of the carriage, a latch for holding said device in its active position when the carriage is shifted back to its first position whereby a total with clearing may be taken in such first position and means operated by the operation of taking such total for releasing said latch.

27. The combination with adding mechanism and a carriage capable of occupying two positions for printing two columns of numbers, of means settable to condition the machine for taking a total, means whereby the carriage when shifted to one of its positions sets said mechanism to take a total in one of said columns, a device for holding said settable mechanism in set position, means for automatically releasing said device by the operation of taking a total in the other column and apparatus for moving said carriage from said first mentioned position to said second position actuated by the operation of taking a total.

28. The combination with adding mechanism including register wheels movable to active and inactive position, to and fro movable operating mechanism; and a carriage shiftable to two positions for printing amounts in two columns, of a device settable to condition the machine for causing the register wheels to be moved to operative position on the forward stroke of said operating mechanism and moved into inactive position on the return stroke of said operating mechanism whereby a total is taken, said device being normally inoperative in the first position of the carriage, means whereby the carriage when shifted to its second position sets said device, means controlled by the shifting of the carriage to its second position for disabling the device for causing the register wheels to be moved to inactive position on the return stroke of the operating mechanism whereby a sub-total is taken in the second position of the carriage, and means operated by the act of taking a sub-total for returning the carriage automatically to the first position.

29. The combination with adding mechanism of a carriage capable of occuping two positions for producing a report in two columns, means settable to condition the machine for taking a total and clearing the adding mechanism, means for actuating said settable means operated by the carriage in one position thereof and other apparatus operated by said carriage for preventing the clearing of the adding mechanism while maintaining said settable means in actuated position.

30. The combination in an adding machine, of a platen, a movable carriage for normally supporting said platen in one column position, listing and adding mechanism normally set for listing, means for setting said mechanism to take a total and connections from said carriage to said setting means for operating the latter to set said mechanism to take a total in said column upon movement of said carriage and platen temporarily out of said column.

31. The combination in an adding machine, of a platen, a movable carriage for normally supporting said platen in one column position, listing and adding mechanism normally set for listing, means for setting said mechanism to take a total, connections from said carriage to said setting means for operating the latter to set said mechanism to take a total upon movement of said carriage and platen out of said column position, and apparatus for returning said carriage and platen to said position while still retaining said setting means operated.

32. In a machine including listing, adding and totalizing mechanism, the combination of a carriage having two positions in one of which the mechanism is normally set for listing and adding, means brought into action by the movement of the carriage to its second position for taking a total and for retaining the total in the machine, means for holding the totalizing mechanism in total taking position, means for locking the carriage in its second position, said means released by the operation of printing a total in that position allowing the carriage to return to its first position and means whereby the printing of a total in said first position releases said retaining means.

HARRY LANDSIEDEL.